United States Patent [19]

Rorabaugh

[11] Patent Number: 5,790,227

[45] Date of Patent: Aug. 4, 1998

[54] HIGHEST-OPHTHALMIC-QUALITY HAND-ASSEMBLED INSTANT MULTI-FOCAL PRESCRIPTION EYEGLASSES CUSTOM ADJUSTED TO WEARER ASTIGMATISM, PUPILLARY DISTANCE AND/OR SEGMENT HEIGHT

[76] Inventor: Dale Rorabaugh, 4566 Via Gaviota, Rancho Santa Fe, Calif. 92067

[21] Appl. No.: 647,575

[22] Filed: May 13, 1996

[51] Int. Cl.$^6$ .................................................. G02B 7/06
[52] U.S. Cl. .................................................. 351/55; 351/54
[58] Field of Search .......................... 351/47, 57, 54, 351/55, 41

[56] References Cited

U.S. PATENT DOCUMENTS 3,958,867 5/1976 Morgan .................................. 351/47

*Primary Examiner*—Hung X. Dang
*Attorney, Agent, or Firm*—Fuess & Davidenas

[57] ABSTRACT

Multi-focal prescription composite lenses having at least two corrections are made by adhering a first-part lens having a predetermined positive or negative diopter correction realized by a cylinder correction prescription on a rear surface and a preselected front surface, to a second-part lens having a predetermined prescription correction at a portion of a front surface and a preselected rear surface that is complimentary to the front surface of the first lens. A lens attachment feature, normally a tab, is integral with at least one of the first- and second-part lens, and persists in the multi-focal prescription composite lens. An eyeglass frame has and presents a complimentary feature, normally a channel within a front piece to the frame, that engages and holds the multi-focal prescription lens to the frame at an adjustable pupillary distance. Two composite lenses are assembled, and permanently mounted in and to the frame, totally without power tools. The second-part lens of each composite lens may optionally be tinted, treated, or, in particular, polaroid. Lens surrounds help disguise the substantial round appearance of the composite lenses in the hand-assembled multi-focal prescription eyeglasses.

12 Claims, 3 Drawing Sheets

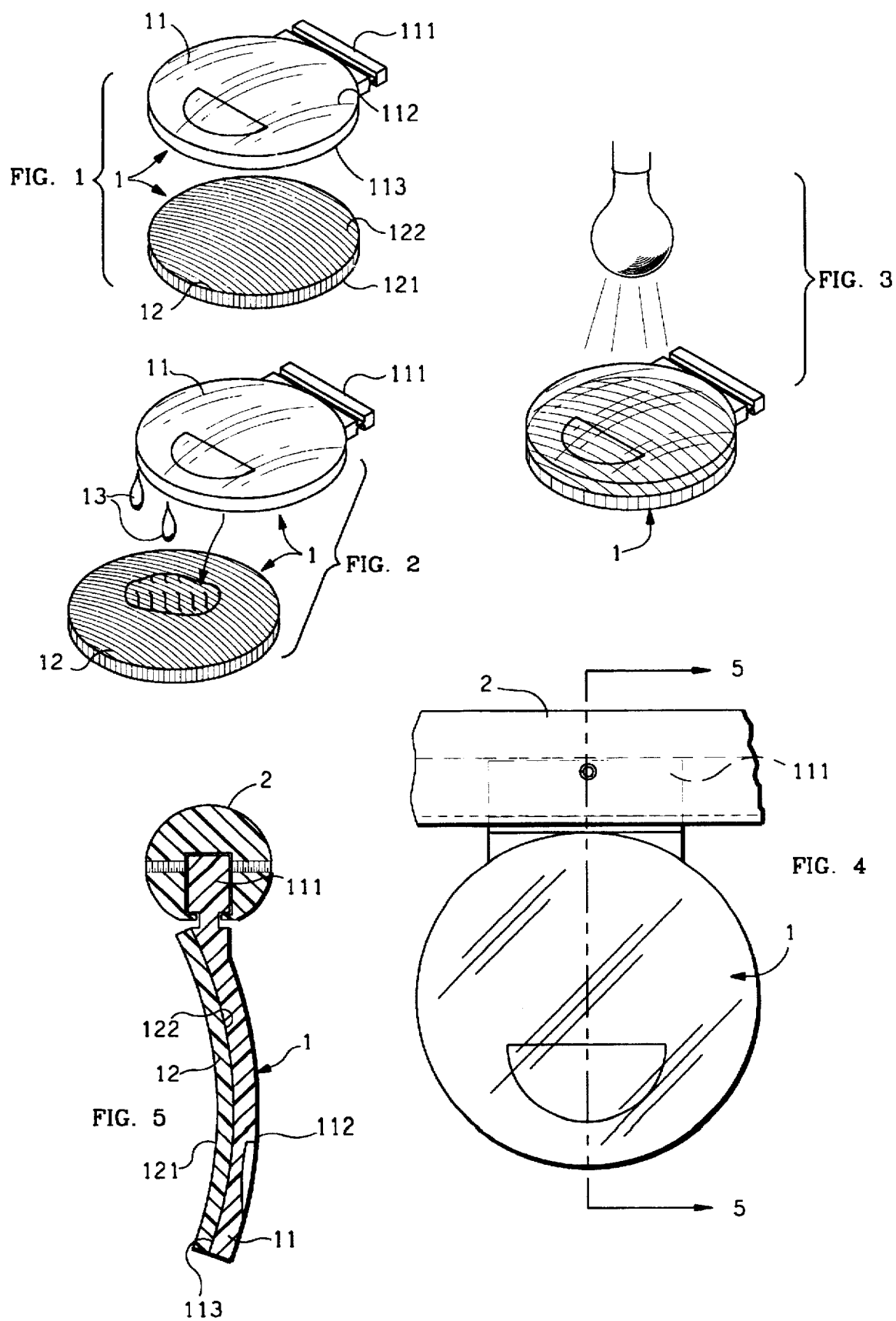

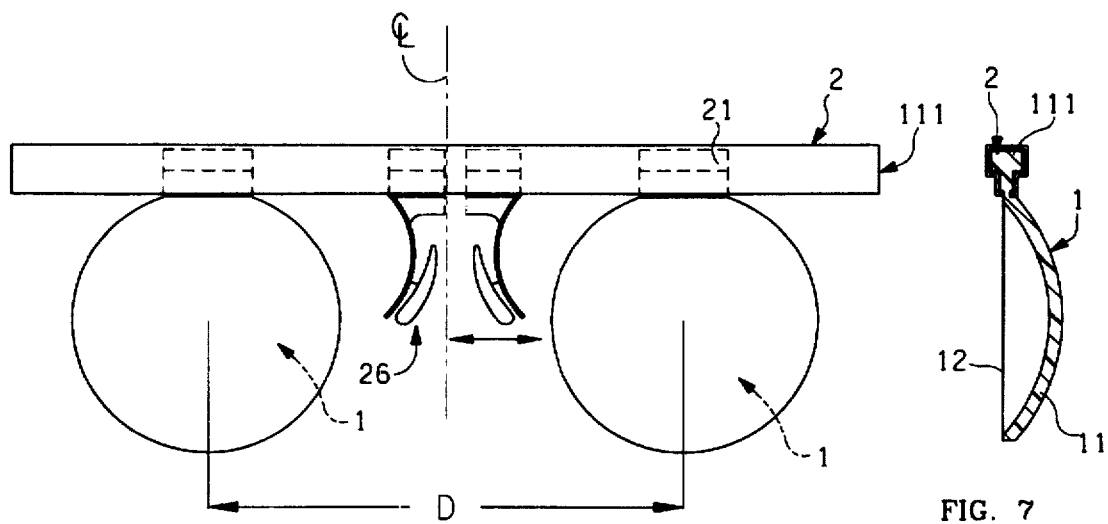
FIG. 6
FIG. 7
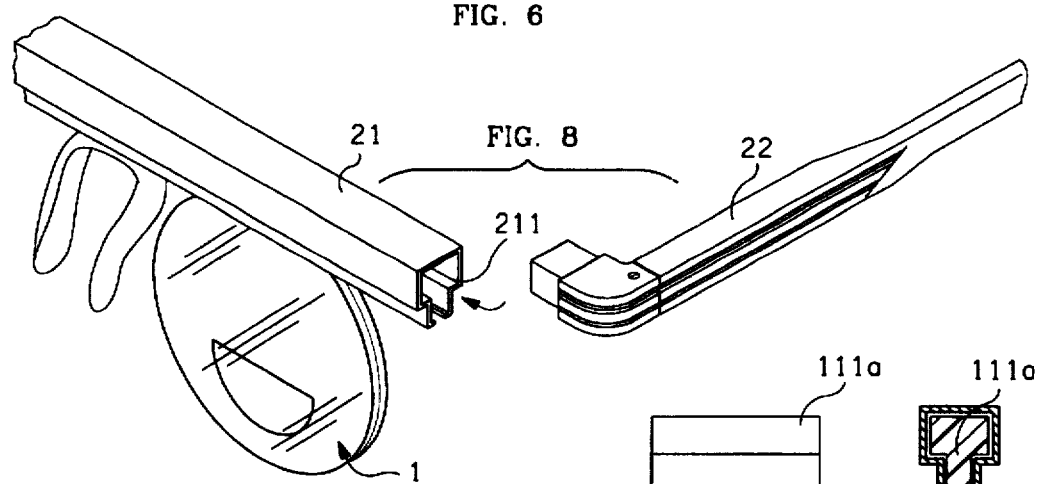
FIG. 8
FIG. 10a
FIG. 10b
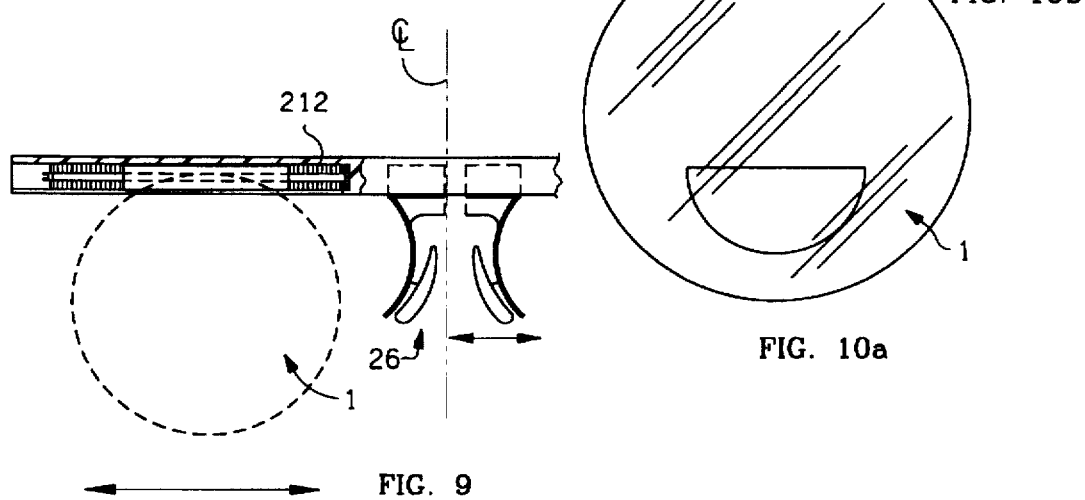
FIG. 9

HIGHEST-OPHTHALMIC-QUALITY HAND-ASSEMBLED INSTANT MULTI-FOCAL PRESCRIPTION EYEGLASSES CUSTOM ADJUSTED TO WEARER ASTIGMATISM, PUPILLARY DISTANCE AND/OR SEGMENT HEIGHT

BACKGROUND OF THE INVENTION

1. Field of the Invention

The present invention generally concerns eyeglasses, and more particularly concerns (i) manual methods of assembling complete multi-focal prescription eyeglasses that include, as the lenses of the eyeglasses, two composite lens each of which is made from two pre-formed lens blanks adhered to each other, and (ii) the complete multi-focal prescription eyeglasses with composite lenses so made.

The present invention still more particularly concerns (i) manual methods of assembling multi-focal prescription composite lenses to complimentary frames—including with optimal correction for each of wearer (a) astigmatism, (b) pupillary distance, and/or (c) segment height—in order to make complete multi-focal eyeglasses completely without power tools, and (ii) the complete multi-focal prescription eyeglasses so made.

2. Description of the Prior Art

2.1 Multi-Focal Composite Lenses Producible Without Power Tools Require Power Shapers to be Shaped to Diverse Eyeglass Frames In many, if not most, places of the modern world single vision lenses for prescription eyeglasses are not ground at the time of making the glasses, but are instead selected from an inventory of pre-formed, molded, lenses of various diopter strengths.

This is not the case for prescription eyeglasses having multi-focal lenses. A person requiring correction for myopia (nearsightedness) who also exhibits presbyopia, or the inelasticity of the focusing muscles of the eye as besets most people commencing after about age forty, often finds that, when his or her vision is strongly corrected for myopia so as to permit the viewing of things distant, then objects that are visually close may not be possible of being clearly focused (though the corrective lenses) by the eyes. This is because the focusing muscles of the eyes are no longer sufficiently strong and elastic so as to overcome the corrective power of the eyeglass lenses in the viewing of nearby objects.

Myopia combined with presbyopia thus gives rise to a requirement for multi-focal glasses—the common bi-focal and tri-focal glasses where a person having his or her distance vision requirement corrected for myopia may look through another, different, portion of a corrective lens to view items close by, and/or in the foreground. It is costly and inconvenient to stock lens blanks in all diopters magnification which lens blanks are also pre-formed in various bi-focal corrections. So many different combinations of lenses would be required so as to be unwieldy, and uneconomic. Accordingly, multi-focal lenses are commonly custom ground to an individual prescription, and are to that extent more expensive than single vision lenses.

At least one previous approach exists to creating multi-focal lenses without grinding (of the lens prescription). In this previous system two individual pre-formed lens blanks, or wafers, were combined in order to create a composite multi-focal lens. A first pre-formed lens wafer had (i) a rear surface having a predetermined positive or negative diopter correction, and (ii) a front surface having a predetermined, fixed, curvature. A second pre-formed lens wafer had (i) a predetermined prescription correction at a portion or portions of a front surface and (ii) a rear surface that was of a constant predetermined curvature complimentary to the front surface of the first lens. The first lens is chosen so that, in optical combination with the second lens, it will satisfy a cylinder correction prescription. The second lens is chosen so that, in optical combination with the first lens, it will provide, at a portion of its surface, such a suitable correction to the prescription as permits the lens wearer to view things close by. The two lens are joined to each other by optically clear adhesive, commonly adhesive that is cured by ultra-violet light, so as to form a flawless, uncut, multi-focal prescription lens.

The second lens blank, in particular, may be either bi-focal or tri-focal, and may even be progressive so as to produce the popular "seamless" multi-focal lenses.

A limitation in the prior process exists, however, in that the composite lenses so produced still need be shaped (in the exact same manner as are single-vision lenses) to the particular frame chosen by the wearer. Because (i) the (composite) lens shaping equipments required are akin to lens grinding equipment, and are commonly used in the same laboratory-type or factory-type environment(s), and because (ii) a number of the persons and organizations dispensing multi-focal eyeglasses already have lens grinding equipments, composite lenses have enjoyed, in the over twenty years since their invention, only modest success. In other words, if a powered lens shaper must be used to grind the periphery of the lens, why not also use a powered lens grinder to grind the lens?

A most recent, advanced, system for the production of multi-focal composite lenses is sold as the InstaLens™ Dicon® Lens Wafer System by the Dicon subsidiary of Vismed, Inc., San Diego, Calif., U.S.A. These lenses are descended from the lenses taught in U.S. Pat. No. 3,877,798 to Tolar, et al. for LAMINATED MULTI-FOCAL LENSES. Although these modern composite lenses assemble completely without use of power tools, a power tool is still used to shape each round composite lens produced to the appropriate side of a wearer-chosen frame.

According to the fact that composite multi-focal lenses supplant one machine portion—lens grinding—of the prescription eyeglass production process with a manual process—lens selection and gluing—it would be interesting if the remaining machine portion of prescription eyeglass production—shaping an uncut lens to the shape and size of a particular eyeglass frame—could also be alleviated or eliminated. This would permit that the entire process of the production of prescription eyeglasses could be made completely manual—nonetheless to retaining good ophthalmic quality. If quality eyeglasses, especially multi-focal eyeglasses and/or eyeglasses with treated lenses, could be assembled manually, and without machines, then (i) cost might be reduced, and (ii) the number of locations where prescription eyeglasses are dispensed (necessarily by licensed opticians or optometrists in the U.S.) could be greatly increased. For example, prescription sunglasses, even multi-focal sunglasses, might be obtainable at beachfront sundry stores.

(Note that "drugstore eyeglasses" that are sold for purposes of vision correction without prescription, and that are thus prohibited in most states of the U.S.A. and in most advanced countries, are distinctly not what is contemplated, nor what will be seen to be realized, by the present invention. The present invention concerns true prescription eyeglasses of highest ophthalmic quality. The registered opticians cable of dispensing same are in great abundance in the U.S. labor force circa 1996. It is therefore not unreasonable to contemplate that a store selling a broader range of merchandise than simply eyeglasses might also be able to both legally and satisfactorily vend prescription eyeglasses.)

2.2 High Cost Multi-Focal Polaroid Lenses

Multi-focal prescription lenses with polaroid treatment are, circa 1996, extremely rare and expensive. To the best knowledge of the inventors, only one company (located in Japan) makes (by process of molding) polaroid lens blanks into which are blanks are impressed at a one, front, side thereof a second (bi-focal), or a second and a third (tri-focal) focal region. These polaroid multi-focal lens blanks are extremely expensive, having a wholesale cost of approximately $80 U.S. circa 1996. By the time these blanks are ground with a prescription on a remaining side (creating a prescription multi-focal lens), the typical U.S. retail cost of two lenses typically exceeds, $250 U.S., and is more commonly in excess of $300 U.S. circa 1996.

Nonetheless to the extreme high cost of multi-focal polaroid prescription eyeglasses, it should be understood that both (i) multi-focal prescriptions, and (ii) polaroid, glasses are very prevalent, and popular.

Multi-focal prescription glasses are required by persons otherwise needing corrective lenses that are also presbyopic. Presbyopia, or the loss of elasticity and response in the muscles responsible for focusing the eye, commonly occurs in the forties, and ultimately afflicts almost everyone. With loss of eyeball muscle control eyeglasses must have and present differing magnifications (in different regions of the lens) so as to focus things that are both distant and close. Approximately one hundred and ten million ($110\times10^6$) persons, or fifty-five percent (55%) of the U.S. population wearing corrective eyeglasses, require multi-focal (bi-focal or tri-focal) glasses.

Meanwhile, polaroid glasses, which serve via polarization to pass light that is polarized only in a selected plane, are very effective to reduce glare, especially on the water. They are so effective because reflected light is polarized in a plane that is strongly attenuated, or even excluded, in passage by polaroid eyeglasses. The great popularity of polaroid eyeglasses is evidenced by the fact that approximately twenty percent (20%) of sunglasses sold world wide have this feature.

It would therefore be of interest if some invention could reconcile the difficulties, and high costs, of realizing polaroid treatment in a multi-focal lens.

Consider now the eyeglass technology area of composite prescription lenses, such as the previously discussed systems evolved into the InstaLens® lens wafer system. These systems have been in existence over twenty (20) years. Although the original patents on these and like lens-making systems are generally silent, or make only minimal reference, as regards potential optical treatment(s) of the material(s) from which the composite prescription lenses are made, the long persistence of these composite prescription lenses in the world has likely made that someone, somewhere, has tried to make, or has made, a composite prescription lens that has and incorporates any of (i) common tints, (ii) photochromism, (iii) polaroid, and/or (iv) like treatments as do alter the transmission of light (in manners other than the bending of light rays which is the basic purpose of eyeglasses). In particular, it might be considered that it would likely be routine to at least consider trying to make a composite prescription lens where one of the lens components is, in particular, polaroid.

Alas, any attempts to fashion a polaroid composite prescription eyeglass lens will meet with less than satisfactory results (which is perhaps why the inventors have no knowledge of any such attempts, let alone completed composite polaroid prescription lenses rendered from any such attempt(s)). At the threshold, there are considerable technical challenges, which challenges are perhaps daunting. A polaroid lens is itself commonly a laminate of a thin sheet of polaroid material bound between two optical blanks—a triple laminate. By the time that this laminate lens is combined with yet another lens to make a prescription composite lens, the result tends to be undesirably thick. These challenges can, however, perhaps be overcome.

The heretofore insurmountable problem in making a polaroid composite prescription lens is that both of the two lenses from which such composite lens is made have a preferred angular orientation, and relationship between these orientations can only be finally determined by the eye of the wearer of glasses mounting the lens. The polaroid filter is present in that one lens portion of the composite lens (typically the outermost lens portion in the finished glasses) that also has and presents the multiple focal lengths. (To put the polaroid filter in the other lens would be even more intractable for the alignment problem next discussed.) The other lens portion of the composite lens is selected for containing (when combined with the first lens portion) a particular prescription (in diopters) as is required by the associated eye of the wearer of glasses mounting the lens.

However, adjustment of the prescription to the astigmatism of the eye requires rotation of this first lens portion (bearing the prescription). If, in creating a composite lens, the prescription lens is simply affixed to the polaroid (and multi-focal) lens, then the composite lens so made will be only an approximately-correct multi-focal polaroid composite lens, lacking fine adjustment to the astigmatism of the eyeglass wearer's eye.

The present invention will be seen to rectify this problem, and to permit the making of a multi-focal polaroid composite lens that are adjusted to, and that precisely account for, the astigmatism of the very eye, of the very user, that will view through the multi-focal polaroid composite lens. Moreover, the eyeglass wearer will be seen to be interactively involved in the astigmatism correction, imparting confidence to the user that his or her new (composite) lens is finely tailored to his or her eye as best as is possible. Moreover, the entire process of the making of a multi-focal polaroid composite lens will be seen to be accomplishable manually, with simple tools and totally without machines specifically including grinding, shaping, polishing and/or molding machines.

2.3 Best Final Fit of Eyeglasses to a Wearer's Face and Eyes

It has just been discussed that, in the composite lenses eyeglass system of the present invention, an eyeglass wearer will be seen to be interactively involved in the correction for astigmatism offered by his or her new composite lenses, and by the eyeglasses made from such lenses. This interactive final adjustment of the astigmatism correction is, of course, quite unlike optical-laboratory-built prescription eyeglasses that come pre-ground for the astigmatism of the wearer's prescription, and cannot be altered or adjusted at time of delivery to the wearer.

Meanwhile, prior art patents regarding composite lenses are again largely silent regarding final fitting and adjustment of newly-constructed composite lenses in consideration of the astigmatism of the wearer's eye. Again, however, there is reason to believe that, in the twenty plus year history of composite lenses, it has likely been attempted, or would be obvious to attempt, to interactively check and adjust a composite lens, as built, to the astigmatism of a wearer's eye. One reason for so saying is that there exists in ophthalmology a device called a "trial frame" that holds lenses before a wearer's eyes prior to final finishing and shaping steps. It is not unreasonable to think that a trial frame could be used to hold a composite lens that, as was subsequently rotated in whole or in that part (the back part where exists the prescription embodying astigmatism correction), could be better adjusted to the users eye.

(It will be understood by a practitioner of the ophthalmologic and lenses sciences that a lens corrected for astigmatism is ground to a one diopter correction along a first axis and another diopter correction along a second, perpendicular axis. The lens does therefore not magnify precisely the same in each of two perpendicular directions, and rotation of this lens relative to an astigmatic eye and eyeball of a wearer permits the correction of the lens along each axis to better match the precise correction required by the eye along each of the two axis.)

Indeed, a composite lenses fitting and assembly method in accordance with the present invention will be seen to be explicit in strongly preferring that each lenses (having any non-zero astigmatism correction whatsoever) should be interactively checked against the wearer's eye as and when built. This will be seen to basically be a simple matter of placing an un-cemented composite lens, already temporarily fitted to its final frame, in the frame in front of the wearer's eye, and rotating the (back) lens portion where is the astigmatism-corrected prescription slightly in both directions so as to permit the wearer to identity his or her final preferred axis of astigmatic correction.

However, another major variable of final eyeglass fit and adjustment is handled poorly or not at all in the prior art concerning both laboratory-ground and composite-assembled lenses and eyeglasses. This variable is interpupillary distance, or "IP". The distances between a person's eyes, and from each eye to the mid-line of the nose, are specified on an eyeglass prescription. Eyeglasses are constructed accordingly, whether made with laboratory-ground or composite-assembled lenses. The distance between the lenses (and their axis of focus) being fixed by the frame in which they are held, the only adjustment possible at time of delivery is to skew the frame and attached lenses right or left relative to the wearer's nose by adjustment of the frame nose piece (if the frames so permit, and not all do). The distance of separation of the lenses within the frame cannot,l of course, be varied at all. Even the slight possible left-right adjustment may affect how high the glasses sit on the nose, and thus both (i) the proximity of the lenses to the eyes, and (ii) the location of the focal line of each lenses to relative to the pupil of each eye.

The final optical effect of an eyeglass lens on the vision of an associated eye of an eyeglass wearer is a combination of (i) the correction or corrections provided by the lens, and (ii) where the lens is located in three-dimensional space relative to the three-dimensional eye. Corrective prescriptions are generally measured to the limits of the human subject to discern differences. Errors in the translation of these prescriptions into corrective lens by any process are negliable. Finally, however, and although the care provider writing the prescription also specifies where the corrective lenses are to be positioned (three-dimensional space) relative to the wearer's eyes, accuracy in lens positioning can accrue significant error by the time of the final delivery and fitting of the eyeglasses. To the extent that positioning of the two lenses is flawed—including in interpupillary distance— than the quality of the overall corrective effect provided is also flawed.

The present invention will be seen to permit normally-highly-accurate lenses (as are in fact made by a joining process) to be finally positioned relative to the eyes of an eyeglass wearer, in the frames as finally delivered, with a superior accuracy that is, in fact, derived by assistance of actual feedback from the wearer. The feedback is of the same order, and of the same type of information, as a user currently gives during an ophthalmic examination, save only that the "best and final" responses of the wearer are not being used to write a prescription on paper, but rather to adjust the actual final eyeglass (i) lenses and (ii) frame which the wearer will purchase. In particular, the present invention will be seen to permit adjustment of the positions of both lenses in the frame carrying the lenses to varying monocular interpupillary distances. In other words, each lens can be independently positioned as far or as close to the left, of to the right, of the nose (as the case may be) as is desired.

The niceties of these permitted adjustments, while fully in accordance with realizing in eyeglasses as delivered the complete and exact parameters of an ophthalmic prescription, may seem to be of uncertain efficacy, and effect, relative to less accurate, but more conventional, ways of assembling and delivery eyeglasses. One way in which it can be perceived that the eyeglass system of the present invention might truly "make a difference" is to imagine the performance of the system, when it is later explained, on a Quasimoto-like face and nose that were horribly deformed, and on eyes that were any of mis-positioned, mis-aligned, myopic (or hyperopic, or both!), presbyopic, and/or astigmatic. Conventional systems of eyeglass fabrication and delivery, including systems based on composite lenses, "break down" completely when faced with the awesome challenge of accommodating misshapen skulls. The "breakdown" is revelatory of the minor deficiencies that traditional systems have in delivering eyeglass lenses into precisely optimal positions for all wearer's of eyeglasses, howsoever normal.

The system of the present invention will be seem to be capable of performing quite well on misshapen skulls and errant eyes. It is, or course, not the exclusive purpose of the system to provide eyeglasses for severely misshapen and/or visually impaired persons, but rather to deliver highest-quality ophthalmologic multi-focal lenses into use integrated into eyeglass frames that hold such lenses optimally, or nearly optimally within wearer-discernable limits of error, relative to any eyeglass-wearer's eyes.

2.4 Specific Prior Art Patents

U.S. Pat. No. 4,190,621 to Greshes for a METHOD FOR MOLDING OPTICAL PLASTIC LENSES OF THE STANDARD AND BIFOCAL TYPE discloses a bifocal lens produced on either a previously formed blank lens, or completely in a singular casting between two molds. The bifocular lens is obtained by supporting a bifocal lower mold having a recessed bifocal well area on its concave surface and filling the lower mold with a resin material. By positioning an upper mold in vertically spaced relationship with the lower mold, the resin material is displaced to extend between the overlapping surfaces of the molds to form the configuration of the bifocal lens with a bifocular portion on the convex lens surface corresponding to the bifocal well on the lower mold. Curing of the resin material situated between the molds and cooling the resin material and the molds forms the complete lens. Thereafter a separating of the bifocal lens from between the molds leaves the bifocal lens in a position to be completed and installed in a pair of eye glasses. Single vision ophthalmic lenses are similarly produced by means of the method.

U.S. Pat. No. 4,461,550 to Legendre for a PROGRESSIVE OPHTHALMIC LENS discloses a progressive ophthalmic lens is disclosed which has an upper part of constant refractive power for distance vision and a lower part of progressively variable refractive power for near vision. In order to increase the effective field of intermediate vision while providing smooth transition between the upper and lower parts of the lens for the user, an additional segment providing a local addition of refractive power is superposed on at least a portion of the progressive variable power zone of the lens. The additional segment may comprise an insert or a protuberance on the progressive portion which may be formed as a surface film on a blank base or substrate. The additional segment may have constant refractive power or include a progressively variable refractive power area.

U.S. Pat. No. 4,576,623 to Mann for a METHOD FOR MAKING MULTIFOCAL OPHTHALMIC LENS discloses a laminated multifocal prescription ophthalmic lens comprising a plano (zero power) cap element incorporating a convergent near-vision multifocal segment, the cap being cemented to a prescription-ground single vision base element. The back surface curvature of the base is configured to provide prescribed sphere, cylinder and other vision-corrective refraction characteristics to the laminated lens.

U.S. Pat. No. 4,577,942 to Frieder, et. al. for a LAMINATED HIGH CORRECTION EYEGLASS LENS discloses a high index of refraction glass base lens in combination with readily cast CR-39 or equivalent plastic veneer overlay. The high index of refraction glass serves to bend light quickly and radically to eliminate the need for excessive lens thickness and curvature, thus reducing the overall mass and weight of the lens. For example: A −10.00 D. prescription lens made from CR-39 plastic requires front and back curvatures totalling −10.60 D. with an accompanying edge thickness at 71 mm diameter of 17.3 mm. This same −10.00 D. prescription lens made from the standard crown glass of the ophthalmic industry (index of refraction 1.523) would require a total front and back curves of −10.00 D. and would have an accompanying edge thickness at 71 mm diameter of 16.5 mm. The subject invention lens utilizes high index of refraction glass, so that a −10.00 D prescription can be made from a lens embodiment whose front and back curves total −6.57 D. with an accompanying edge thickness at 71 mm of 9.1 mm. The veneer overlay has a central zone with no correction, and negative correction on its periphery. Thus asphericity is provided irrespective of whether the base lens correction is positive or negative. In addition, bifocal, trifocal, or other vocational corrections may be positioned in the veneer overlay.

U.S. Pat. No. 4,798,608 to Grendahl for a LAMINATED ZONE OF FOCUS ARTIFICIAL LENS discloses an implantable or contact lens for replacement of a defective natural lens in an eye in which various portions of the lens are laminated horizontally to have different powers to produce in-focus images on different portions of the retina of objects which are located at various distances from the eye, thereby substituting for the natural focusing action of the eye. The image processing capability of the brain functions to largely ignore the out-of-focus images and concentrate on the in-focus image of the object selected by the brain for consideration.

U.S. Pat. No. 4,846,913 to Frieder, et. al. for a METHOD FOR MAKING BIFOCAL LENS discloses an apparatus and a method for making an eyeglass lens module having two lens components. The first component is a conventional single vision stock lens having conventional corrections in the negative or positive diopter range. The second lens component is an overlay lens desirably formed from a plastic or glass and is as thin as practical. The overlays are in modules containing bifocals or trifocals or vocational modifications of a given diopter correction. The method of casting the overlaid lens includes aging a mixture of a plastic monomer and an inorganic peroxide catalyst prior to use. The two lens components are then optically and physically bonded together. Once the two lens components are secured to each other, they can then be fitted into a spectacle frame and delivered to the patient. When tinting is required, the plastic overlay can be readily tinted by conventional dye and methods.

The previous patents in general teach and suggest that it is possible to make composite lenses in a number of different configurations having a number of different properties by a number of different methods, but do not generally carry on to teach or suggest an such non-traditional packaging and assembly of the composite lenses so made into complete eyeglasses as is the subject of the present invention.

SUMMARY OF THE INVENTION

The present invention contemplates (1) a method of hand assembling, placing and adjusting composite lenses in frames in consideration of wearer (i) pupillary distance, (ii) astigmatism, and (iii) segment height of a bi-focal, or the vertical positioning of a progressive, lens, so as to make highest-ophthalmic-quality multi-focal prescription eyeglasses, including eyeglasses with treated lenses including polaroid lenses, and (2) the eyeglasses so made.

In accordance with the present invention complete multi-focal prescription eyeglasses, and not just the composite lenses therefore, may be completely assembled by hand without, in particular and without limitation by way of lack of enumeration, any machine grinders or shaping devices whatsoever. Nonetheless to being made completely without grinding or shaping, or without manipulation by any mechanical power tool whatsoever, eyeglasses in accordance with the present invention are equal or better in ophthalmic quality than eyeglasses made in optical laboratories.

Further in accordance with the present invention, the multi-focal prescription eyeglasses so made may be adjusted at time of hand assembly in any, and preferably in all, of (i) pupillary distance, (ii) astigmatism, and/or (iii) desired segment height of bi-focal, or the vertical positioning of progressive, lenses. Adjustment for astigmatism is realized by rotational adjustment of the two components of a composite lenses before these components are permanently cemented together. This adjustment is facilitated by temporarily holding at least one lens component in its ultimate frame. Adjustment for pupillary distance is obtained varying the spacing between each (composite) lenses and the centerline of the nose, and relative to the other (composite) lenses, in the frame in which the lenses are held. Finally, adjustment of segment height for a bi-focal lenses, or the vertical positioning of a progressive lenses, is realized by a convenient use of different size nose pieces. Nonetheless to being completely hand-assembled from standardized parts, the eyeglasses so assembled are not only of finest ophthalmic quality, but are actually mounted in frames at and with superior Still further in accordance with the present invention, complete multi-focal prescription eyeglasses may be made having lenses that exhibit any of tints, photochromism, polaroid, and like treatments as do selectively alter the transmission of light (in manners other than the bending of light rays which is the basic purpose of eyeglasses). The lenses may, in particular, be both (i) multi-focal and (ii) polaroid, with the alignments of the two or more segments of differing focal lengths, and the polarization, being simultaneously correct.

Nonetheless to being of excellent, even superior, ophthalmic quality, eyeglasses in accordance with the present invention are, as hand assembled from common parts, potentially economical of construction. They are suitable for casual use—such as for prescription sunglasses—by the populations of first world economies, and for general use in second and third world economies.

A slight limitation on eyeglasses in accordance with the present invention goes not to performance but rather to appearance; the composite lenses from which the eyeglasses are constructed are (substantially) round. Because the desired shapes of the lenses in most eyeglass styles are not round, a number of (i) surrounds, (ii) transparent extensions to the apparent shape and size of the (round) lens, and (iii) other disguising structures, as commonly used to alter the external appearance of the round lenses of eyeglasses in accordance with the present invention. By adroit use of these cosmetic appendages, it is difficult to visually distinguish the appearance of multi-focal prescription eyeglasses in accordance with the present invention from conventional prescription eyeglasses having lenses that are custom ground to prescription, and that are ground to shape in order to fit into various frames.

1. Embodiments of the Invention—Multi-Focal Eyeglasses

Therefore, in one of its aspects, the present invention may be considered to be embodied in eyeglasses having a composite lens incorporating at least two corrections. This composite lens is made as a (1) first lens having (1a) a predetermined positive or negative diopter correction realized by a cylinder correction prescription on a rear surface and (1b) a preselected front surface, optically bonded to (2) a second lens having (2a) a predetermined prescription correction at a portion of a front surface and (2b) a preselected rear surface that is complimentary to the front surface of the first lens, therein jointly forming a multi-focal prescription composite lens. Particular to the present invention, a lens attachment feature is permanently affixed to, and is preferably integral with, at least one lens, and this feature persists in the multi-focal prescription composite lens made with this at least one lens. Meanwhile, an eyeglass frame has and presents a frame attachment feature that is complimentary to the lens attachment feature. The two complimentary features engage and hold the multi-focal prescription lens to the frame.

Notably, the bonding of the first lens to the second lens is effected manually, preferably by gluing. The engagement of the eyeglass frame to the multi-focal prescription composite lens is also effected manually. Accordingly, complete assembly of the eyeglasses is effected manually nonetheless that the eyeglasses have at least one multi-focal prescription lens.

In details of construction, the lens attachment feature is preferably a tab, and the frame attachment feature is preferably a cavity complimentary in shape to the tab. The frame's cavity may in particular be in the form of a channel in which channel the tab of the multi-focal prescription composite lens is moved transversely relative to the nose of wearer of the eyeglasses, thus permitting adjustment of monocular pupillary distance for the multi-focal prescription composite lens.

2. Embodiments of the Invention—Methods of Constructing Multi-Focal Eyeglasses

In a related one of its aspects, the present invention may be considered to be embodied in a method of manually assembling eyeglasses including a lens having at least two corrections. The method proceeds by (1) manually selecting a first lens having (i) a predetermined positive or negative diopter correction realized by a cylinder correction prescription on a rear surface and (ii) a preselected front surface, and (2) manually selecting a second lens having (ii) a predetermined prescription correction at a portion of a front surface and (ii) a preselected rear surface that is complimentary to the front surface of the first lens.

At least one of the first lens component and the second lens component has an attachment feature. The first lens is optically attached to the second lens at their complimentary surfaces, thereby placing the predetermined prescription correction that is at a portion of the front surface of the second lens at an exterior surface of the bonded composite lens. Particularly in accordance with the present invention, the bonded composite lens is then manually attached to an eyeglass frame by mating the first attachment feature that is upon at least one of the lens to a complimentary second attachment feature that is upon the frame, the second attachment feature receiving, and engaging, the first attachment feature so as to thereafter hold the bonded composite lens to the frame.

The selection may particularly be of at least one lens having a tab attachment feature that extends radially therefrom substantially in a plane of the lens. The attaching of the bonded composite lens to the eyeglass frame by the tab attachment feature is by then process of mating this tab attachment feature to a complimentary tab-attaching feature on the frame—preferably a channel—that is suitable to receive, and to engage, the tab feature. The tab attachment feature is preferably temporarily movably held relative to the complimentary tab-attaching feature of the frame. When so held the bonded composite lens is then temporarily moved into, and held at and by the frame, a position in front of an eye of a wearer of the eyeglasses. This movements serves to adjust monocular papillary distance.

3. Embodiments of the Invention—Methods of Constructing Multi-Focal Eyeglasses with Lens Treatments Including Polaroid In still another of its several aspects, the present invention may be considered to be embodied in a modular system for making multi-focal eyeglasses having any of tints, photochromism, polaroid, and like treatments as do selectively alter the transmission of light (in manners other than the bending of light rays which is the basic purpose of eyeglasses)/The system is based on a frame having and presenting frame features of predetermined shape and size to which frame features fit and are attached lenses. Each of two composite lens has and presents features that are complimentary to the frame features so as to permit attachment of each lens to the frame.

Each composite lens consists of a first-part lens that is both multi-focal and that has any of tints, photochromism, polaroid, and like treatments as do selectively alter the transmission of light. This first-part lens has and presents one surface of predetermined fixed curvature. The composite lens also includes a second-part, prescription, lens that has and presents one surface of predetermined fixed curvature complimentary to the surface of the first-part lens. The second-part lens is joined to the first lens, normally by gluing, along their surfaces of complimentary curvature, thus making a multi-focal composite lens having any of tints, photochromism, polaroid, and like treatments.

The entire multi-focal eyeglasses with any of tints, photochromism, polaroid, and like treatments are thus formed as a frame and two lenses without necessity of shaping the lenses.

3. Embodiments of the Invention—Method of Assembling and Fitting Multi-focal Composite Lenses to Eyeglass Frames In still yet another of its several aspects, the present invention may be considered to be embodied in a method of assembling and fitting multi-focal composite lenses to eyeglass frames in consideration of a wearer of multi-focal prescription eyeglasses.

In the method a first lens having (i) a predetermined positive or negative diopter correction realized by a cylinder correction prescription on a rear surface and (ii) a preselected front surface optically bonded, is temporarily affixed to a second lens having (ii) a predetermined prescription correction at a portion of a front surface and (ii) a preselected rear surface that is complimentary to the front surface of the first lens, thereby forming a temporary multi-focal prescription composite lens.

This temporary multi-focal prescription composite lens is temporarily placed in the same eyeglass frame that it will finally occupy. When so placed it's astigmatic correction is interactively checked and adjusted relative to an associated eye of a wearer of the eyeglass frames by action of rotating the first lens relative to the second lens until the wearer reports best corrective results. Only then is the first lens affixed, normally by adhesively bonding, to the second lens, forming a permanent multi-focal prescription composite lens at the rotationally adjusted astigmatic correction.

Still further, and next, the permanent multi-focal prescription composite lens is again placed in the frame. It is now moved left and right in position in the frame and before the associated eye of the wearer until a proper pupillary distance is established. The permanent multi-focal prescription composite lens located in the frame at the correctly adjusted pupillary distance is then affixed to the frame, typically by set screws, by a threaded shaft, and/or by adhesive.

Still further, a nose piece of the eyeglass frames may be adjusted so that the permanent multi-focal prescription composite lens affixed in the frame is held either higher or lower in vertical height before the associated eye of the wearer, all as the wearer desires and indicates.

According to these several adjustments, any of (i) the astigmatic correction, (ii) the pupillary distance, and/or (iii) the segment height for a bi-focal lens (or equivalently, a vertical positioning of a progressive lens), of a permanent multi-focal prescription composite lens mounted in eyeglass frames may each be independently adjusted.

These and other aspects and attributes of the present invention will become increasingly clear upon reference to the following drawings and accompanying specification.

BRIEF DESCRIPTION OF THE DRAWINGS

FIG. 1 is a diagrammatic perspective view of a (1) first lens, having an integral extending attachment feature in the form of, by way of example, a tab, also having (1a) a predetermined positive or negative diopter correction realized by a cylinder correction prescription on a rear surface and (1b) a preselected front surface, positioned relative to (2) a second lens, by way of example a polaroid lens, having (2a) a predetermined prescription correction at a portion of a front surface and (2b) a preselected rear surface that is complimentary to the front surface of the first lens, both lenses being in accordance with the present invention.

FIG. 2 is a diagrammatic perspective view of an optical joining by adhesive of the first lens to the second lens, both of which were previously seen in FIG. 1, so as to form a multi-focal prescription composite lens in accordance with the present invention.

FIG. 3 is a diagrammatic perspective view showing one preferred, ultraviolet light, curing of the adhesive of the multi-focal prescription composite lens in accordance with the present invention previously seen in FIG. 2.

FIG. 4 is a front view of the multi-focal prescription composite lens in accordance with the present invention previously seen in FIG. 3; the extending attachment feature in the form of, by way of example, a tab being prominent.

FIG. 5 is a side plan view, taken along aspect line 5—5 in FIG. 4, of the multi-focal prescription composite lens in accordance with the present invention in accompaniment with a frame, also in accordance with the present invention, that surrounds and engages the lens' tab engagement feature.

FIG. 6 is a front plan view of the frame in accordance with the present invention, a small portion of which frame was previously seen in FIG. 4, where the positions to be occupied by composite lenses are outlined in a dashed line.

FIG. 7 is a side plan view of the composite lens in accordance with the present invention at the same scale as FIG. 6, the composite lens being roughly juxtaposed in position to be rotated 90° and be slid within a channel of the front piece of the frame seen in FIG. 6.

FIG. 8 is an exploded perspective view more particularly showing how a composite lens in accordance with the present invention is slid within a channel of the front piece of the frame in order to be retained therein, and, subsequently, a temple piece is also affixed to the frame.

FIG. 9 is an x-ray view showing a sophisticated, screw lock, retention and adjustment mechanism within a channel of the front piece of the frame, the mechanism serving to locate and to retain a composite lens that is shown in dashed line.

FIG. 10, consisting of FIGS. 10a and 10b, shows in FIG. 10a an front view of a composite lens in accordance with the present invention having a rather smaller and more rudimentary tab attachment mechanism than, for example, the composite lens shown in FIGS. 4 and 5, while FIG. 10b shows the location of this rudimentary tab attachment within the channel of the front piece of a frame, where it is commonly maintained by adhesive.

DESCRIPTION OF THE PREFERRED EMBODIMENT

Figure 11A:
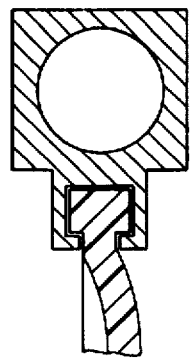
FIGS. 11, consisting of FIGS. 11a thought 11c, are side plan views of a cross section of variously shaped channeled front pieces to frames in accordance with the present invention.

A diagrammatic perspective view of two, as yet unassembled, lens portions 11 and 12 of a composite lens 1 in accordance with the present invention is shown in FIG. 1. A first lens portion, or lens 11 has and presents an attachment feature 111. This attachment feature 111 is typically integral, and is precision molded along with the lens 11 itself. In the illustrated embodiment this attachment feature 111 is (i) extending, and, by way of example, (ii) is in the form of a tab. This attachment feature 111 is important to the present invention because it ultimately permits of the attachment of the first lens portion, or lens 11, and, further, the entire composite lens 1 including such lens portion 11, to a frame 2 (shown in FIGS. 4–9).

However, a practitioner of the mechanical arts will recognize that attachment of the lens portion 11 to a frame 2 may be variously performed, and that the appearance of the attachment feature 111 may be vastly different—even so far as comprising a socket or cavity into which a complimentary feature on the frame 2 is fit. Accordingly, the attachment feature 111 should be regarded for what it does, as will be explained, and not solely for what it looks like in that particular embodiment in which the present invention is herein taught.

The lens 1 also has and presents (i) one or more predetermined positive or negative diopter corrections (one such being illustrated) realized by a cylinder correction prescription (one such being illustrated) on its front surface 112, while having (ii) a preselected and predetermined rear surface 113. Note that the cylinder correction prescription on the front surface 112 is in fixed location relative to the attachment feature 111. This is simply so as to insure that cylinder correction prescriptions, commonly called "bi-focal or tri-focal", are correctly located horizontal, and parallel to the front piece 21 of the frame 2 (shown in FIGS. 7 and 8) in the finally assembled complete eyeglasses, as will be explained. Conversely, certain other features—as will be discussed—are not initially co-located—as will be discussed—, providing thereby a capacity to align lens portions to the ultimate user of the eyeglasses of the invention—which capacity is part of the advantage of the invention.

The lens 11 is shown in FIG. 1 in position relative to the second lens portion, or lens 12. The lens 12 is, by way of example, a polaroid lens. It could also be clear, or tinted, or surface coated or treated (including for transmission of ultraviolet light), or subject to any of the treatments to which eyeglass lenses are commonly subject.

The lens 12 also has a predetermined prescription correction at a portion of its rear surface 121, and a preselected front surface 122 that is complimentary to the front surface 113 of the first lens 11.

A diagrammatic perspective view of an optical joining, normally by adhesive 13, of the first lens 11 to the second lens 12 is shown in FIG. 1. The joining produces the multi-focal prescription composite lens 1.

Notably, the lens 11 is rotatable relative to the lens 12, and vice versa, when they are placed together, and at any time before the adhesive 13 is cured as is illustrated to transpire by ultraviolet light in FIG. 3. That the lenses 11, 12 rotate on their complimentary mating surfaces may also be imagined by momentary reference to FIG. 5.

The lens 12 is typically selected as corrected for astigmatism. This means that it has been molded to a one diopter correction along a first axis and another diopter correction along a second, perpendicular axis. The lens 11 does therefore not magnify precisely the same in each of two perpendicular directions. The axis of astigmatism of the associated eyeball of the wearer of the eyeglasses are probably, based on human physiology, roughly horizontal and vertical, but are not precisely known. It is accordingly useful to rotate the lens 11 relative to the associated astigmatic eye and eyeball of the wearer of the glasses in order to permit that the corrections of the lens along each (of two perpendicular) axis should better match the precise corrections required by the eye along each of the two axis.

The system of the present invention permits, and even encourages, this rotational alignment. The two lens 11 and 12 are temporarily held together, such as by use of a thin meniscus of water. They are temporarily placed in the frame 2 by an engagement between the attachment feature 11 on the lens 1 and a complimentary feature on the frame 2. While the composite lens 1 is held in front of a wearer's associated eye, the lens 12 is rotated relative to the lens 11, changing the direction of the axis of maximum, and of minimum, diopter magnification. Verbal responses by the wearer of the prescription eyeglasses defines the desired alignment of these axis (for each eye). Pre-existing lens 11, 12—which are precision molded—thus permits "point of sale" realization of the desired, prescribed, alignment of the axis of astigmatism. Moreover, people may respond differently to their actual eyeglasses than to simulations in an optometrists chair, and during visual testing, where they have responded to "choose which looks better, this (focal axis) of this (focal axis)".

Herein lies and advantage of the present invention. Leaping ahead momentarily to FIGS. 6–9, and envisioning by reference thereto that the composite lens 1 will ultimately be assembled into prescription eyeglasses for a particular user/wearer, it is possible to check/recheck, confirm/re-confirm or validate/readjust the alignments of the axis of astigmatic correction of the composite lens 1 by reference to the eye of the user! Namely, the lens 1 that is till rotatable in its parts 11, 12 is placed in front of the user/wearer's (appropriate) eye. The lens 11 is (normally) held steady, perhaps by its attachment feature 111, while the lens 12 is rotated. The user/wearer can report which alignment of the axis of astigmatism he or she prefers, and the two lens portions 11, 12 of the composite lens 1 can be "set" accordingly.

A diagrammatic perspective view of one, preferred, affixation of the lens portions 11, 12 is shown in FIG. 3. Ultraviolet light is used to cure the adhesive of the multi-focal prescription composite lens 1, fixing the lens portions 11, 12 together permanently.

A front view of the multi-focal prescription composite lens 1 in accordance with the present invention is shown in FIG. 4. The (extending) attachment feature 111 in the form of, by way of example, a tab, is prominent.

A side plan view along aspect line 5—5 of FIG. 4 is shown in FIG. 5. The multi-focal prescription composite lens 1 is now shown in accompaniment with a frame 2 that surrounds and engages the tab engagement feature 111 of the composite lens 1.

A front plan view of the frame 2, a small portion of which frame was previously seen in FIG. 4, is shown in FIG. 6. The positions to be occupied by composite lens 1 are outlined in a dashed line. Adjustment for pupillary distance is by placing the frame 2 and composite lenses 1 on a wearer, and in front of his or her eyes, and then varying the spacing between each (composite) lenses and the centerline of the nose, and relative to the other (composite) lenses, by sliding the retaining features 111 in the front piece 21 of the frame 2 in which the composite lenses 1 are held. When each composite lens 1 is in the correct location it is permanently affixed to the frame, such as by the set screws shown in FIG. 5 or by adhesive (not shown).

In a similar manner, the segment height of a bi-focal composite lens 1, or the vertical positioning of a progressive composite lens 1, may be realized by a convenient use of differently size and positioned nose pieces 26. The nose pieces 26 also preferably slide along (at least for a limited extent) the fronts piece 21 to the frame 2, normally in their own region of the same channel in which slide in other regions the composite lenses 1. The variable separation, and extension, of the variously selected and positioned nose pieces 26 permits fine adjustment of the segment height of a bi-focal composite lens 1 (or, equivalently, the vertical positioning of a progressive composite lens 1) in accordance with the desires of the wearer of the glasses.

A side plan view of the composite lens 1 at the same scale is shown in FIG. 7. The composite lens 1 is juxtaposed in rough position to be rotated 90° and be slid within a channel 211 of the front piece 21 of the frame 1, as will be best seen next in FIG. 8.

An exploded perspective view more particularly showing how the composite lens 1 is slid within the channel 211 of the front piece 21 of the frame 2 in order to be retained therein is shown in FIG. 8, and an x-ray view of the same co-location in FIG. 9. Subsequent to lodging of the lens 1 within the channel 211 of the front piece 21 of the frame 21, a temple piece 22 is also affixed to the frame 2. The frame 2 includes a screw within its cavity. A screw engages and moves the lens attachment feature 111 within the cavity, and transversely relative to the nose of wearer of the eyeglasses (not shown). This movement permits precision adjustment of the monocular pupillary distance.

An x-ray view showing one sophisticated, screw lock, embodiment of a retention and adjustment mechanism 212 within the channel 211 of the front piece 21 of the frame 2 is shown in FIG. 9. The mechanism 212 serves to locate, and to retain, the composite lens 1 (shown in dashed line).

A front view of variant embodiment composite lens 1a in accordance with the present invention is shown in FIGS. 10a and 10b. The variant embodiment composite lens 1a has a rather smaller and more rudimentary tab attachment mechanism 111a than, for example, the composite lens 1 shown in FIGS. 4 and 5. The location of this rudimentary tab attachment mechanism 111a within the channel 211 of the front piece 21 of a frame 2, where it is commonly maintained by adhesive (not shown) is particularly illustrated in FIG. 10b.

Figure 11B:
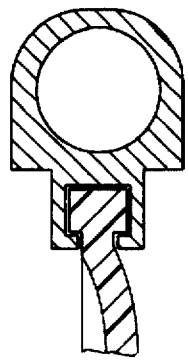
Figure 11C:
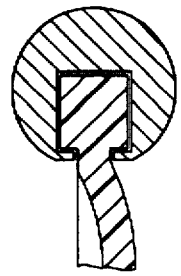

Side plan views of the cross sections of variously shaped channeled front pieces 21 to frames 2 are shown in FIGS. 11a through 11b.

Figure 12:
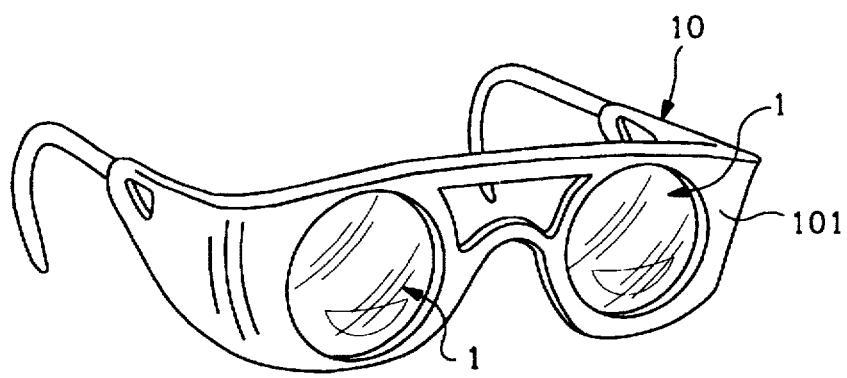
FIG. 12 is a diagrammatic view of complete eyeglasses in accordance with the present invention, the eyeglasses mounting a first style of optional lens surrounds.

A diagrammatic view of complete eyeglasses 10 in accordance with the present invention is shown in FIG. 12. The eyeglasses 10 mount a first style of optional lens surrounds 101.

Figure 13:
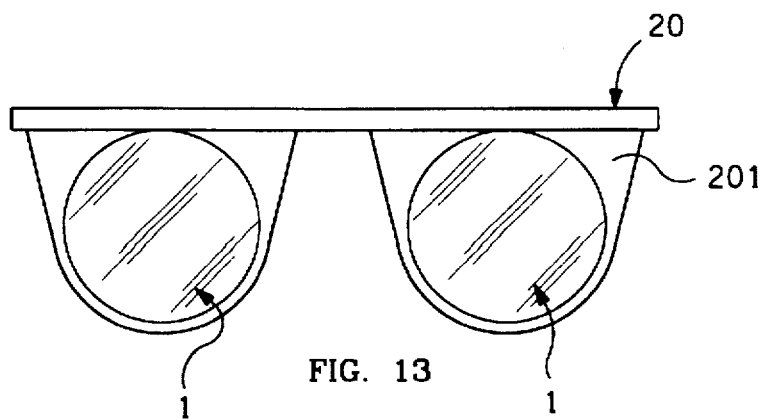
FIG. 13 is a front plan view of complete eyeglasses in accordance with the present invention, the eyeglasses now mounting a second style of optional lens surrounds.

A front plan view of further complete eyeglasses 20 in accordance with the present invention is shown in FIG. 13. The eyeglasses 20 now mount a second style of optional lens surrounds 201.

In accordance with the preceding explanation, it will be understood that, nonetheless to being completely hand-assembled from standardized parts, eyeglasses in accordance with the present invention so assembled are not only of finest ophthalmic quality, but are actually mounted in frames at and with a superior adjustment to the wearer's face and eyes at time of fitting.

In accordance with the preceding explanation, variations and adaptations of highest-ophthalmic-quality hand-assembled instant prescription eyeglasses in accordance with the present invention will suggest themselves to a practitioner of the eyeglass, and eyeglass lens, design and fabrication arts. For example, the attachment feature 111 could have been on the lens 12 as opposed to the lens 11 (with diminished flexibility of adjustment for astigmatism). For example, the attachment feature 111 need not be tab and channel, nor tongue and groove, but could be constructed in accordance with any number of routine mechanical mechanisms for affixing things together at variably adjustable locations along at least one axis.

In accordance with these and other possible variations and adaptations of the present invention, the scope of the invention should be determined in accordance with the following claims, only, and not solely in accordance with that embodiment within which the invention has been taught.

What is claimed is:

1. Eyeglasses comprising:

a lens having at least two corrections made as a first lens having (i) a predetermined positive or negative diopter correction realized by a cylinder correction prescription on a rear surface and (ii) a preselected front surface affixed to a second lens having (ii) a predetermined prescription correction at a portion of a front surface and (ii) a preselected rear surface that is complimentary to the front surface of the first lens, therein to form a multi-focal prescription lens;

a lens attachment feature integral with at least one of the first lens and the second lens, and thus persisting in the multi-focal prescription lens made with this at least one lens;

an eyeglass frame having a frame attachment feature, complimentary to the lens attachment feature, that engages and holds the multi-focal prescription lens via its lens attachment feature, and an adjustment feature by which the multi-focal prescription lens may be moved transversely relative to the nose of wearer of the eyeglasses, thus permitting an adjustment of monocular Pupillary distance for this multi-focal lens;

wherein the affixing of the first lens to the second lens is effected manually; and wherein the engagement of the eyeglass frame to the multi-focal prescription lens is also effected manually;

wherein complete assembly of the eyeglasses is effected manually nonetheless that the eyeglasses have a multi-focal prescription lens.

2. The eyeglasses according to claim 1 wherein the lens attachment feature comprises:

a tab feature extending from the at least one lens, and thus also from the multi-focal prescription lens made with this at least one lens;

and wherein the frame attachment feature comprises:

a cavity complimentary in shape to the tab feature.

3. The eyeglasses according to claim 2 wherein the frame adjustment feature comprises:

a channel in which the tab feature of the multi-focal prescription lens may be moved transversely relative to the nose of wearer of the eyeglasses, thus permitting a corresponding transverse movement of the multi-focal lens, and an adjustment of monocular pupillary distance for this multi-focal lens.

4. The eyeglasses according to claim 3 wherein the frame adjustment feature further comprises:

a screw within the channel which screw serves to engage and to move the lens attachment feature, as is located within the cavity, transversely relative to the nose of wearer of the eyeglasses.

5. The eyeglasses according to claim 2 wherein the frame attachment feature further comprises:

means for selectively holding the tab feature in position within the cavity that is complimentary in shape to this tab feature.

6. The eyeglasses according to claim 5 wherein the means for selectively holding comprises:

a screw within the cavity that engages and moves the tab feature within the cavity, and transversely relative to the nose of wearer of the eyeglasses.

7. The eyeglasses according to claim 5 wherein the means for selectively holding comprises:

adhesive for locking the tab feature within the cavity at a manually adjustable position transversely relative to the nose of wearer of the eyeglasses.

8. The eyeglasses according to claim 1 further comprising:

a facade piece positioned over and about a portion of the lens and the frame.

9. A method of manually assembling eyeglasses including a composite lens having at least two corrections comprising:

manually selecting a first lens having (i) a predetermined positive or negative diopter correction realized by a cylinder correction prescription on a rear surface and (ii) a preselected front surface;

manually selecting a second lens having (ii) a predetermined prescription correction at a portion of a front surface and (ii) a preselected rear surface that is complimentary to the front surface of the first lens;

wherein at least one of the first lens and the second lens has a first attachment feature extending therefrom;

affixing the first lens to the second lens at their complimentary surfaces, therein placing the predetermined prescription correction that is at a portion of the front surface of the second lens at an exterior surface of the bonded lens so as to form a composite lens;

manually attaching the composite lens to an eyeglass frame by mating the first attachment feature that is upon at least one of the lens to a second attachment feature that is upon the frame, which second attachment feature is complimentary to receive, and to engage, the first attachment feature so as to thereafter hold the composite lens to the frame; and temporarily movably holding the first attachment feature of the composite lens relative to the second attaching feature of the frame;

placing the composite lens as is temporarily movably held at and by the frame into a position in front of an eye of a wearer of the eyeglasses;

moving the first attachment feature relative to the second attaching feature, and correspondingly moving the composite lens relative to the frame, and correspondingly moving the composite lens relative to the wearer's nose, so as to adjust monocular pupillary distance.

10. The method of assembling eyeglasses according to claim 9 wherein the manual selectings are of at least one lens having a first tab attachment feature that extends radially therefrom substantially in a plane of the at least one lens; and wherein the attaching of the composite lens to the eyeglass frame by the tab attachment feature is by process of mating this tab attachment feature to a complimentary tab-attaching feature that is suitable to receive, and to engage, the tab feature so as to hold the composite lens to the frame.

11. The method of assembling eyeglasses according to claim 10 wherein the attaching the composite lens to the eyeglass frame by the tab attachment feature transpires by mating this tab attachment feature to a complimentary cavity suitable to receive, and to engage, it so as to hold the composite lens to the frame.

12. The method of assembling eyeglasses according to claim 10 that, between the selectings and the affixing, further comprises:

placing the first lens and the second lens juxtaposed in position in front of an eye of a wearer of the eyeglasses; and rotating the first lens relative to the second lens in response to detected improvement or deterioration of clarity of vision through the juxtaposed lens by the wearer of the eyeglasses.

* * * * *